June 23, 1931.  O. G. SIMMONS  1,811,568
METHOD OF GENERATING GEARS
Filed Nov. 21, 1927  6 Sheets-Sheet 1

INVENTOR;
Olver G. Simmons.

June 23, 1931.  O. G. SIMMONS  1,811,568
METHOD OF GENERATING GEARS
Filed Nov. 21, 1927      6 Sheets-Sheet 6

INVENTOR:
Oliver G. Simmons

Patented June 23, 1931

1,811,568

UNITED STATES PATENT OFFICE

OLIVER G. SIMMONS, OF LAKEWOOD, OHIO

METHOD OF GENERATING GEARS

Application filed November 21, 1927. Serial No. 234,788.

This invention relates to a method of cutting the teeth of gears or gear shaper cutters and is a companion application for Letters Patent to my application filed March 24, 1927, Serial No. 178,021 for method of cutting gear teeth, issued June 24, 1930, No. 1,765,385, and reissued March 31, 1931, No. Re. 18,021, on a reissue application filed September 10, 1930, Serial No. 481,041.. In the specification of that application and patent, the method of generating the teeth of spur and helical gears by means of a straight tooth gear shaper cutter is fully disclosed. The present invention embodies a method of generating the teeth in spur and helical gears utilizing a cutter commercially known as a spiral gear shaped cutter, that is to say, a cutter with twisted teeth.

Various methods have been practiced commercially in cutting the teeth of gears, some of which may be referred to briefly:

The oldest in point of time is probably the milling machine method by which the index head of said machine is geared to give the proper rotational movement to the work with respect to the longitudinal travel of the table slide, a rotary form cutter being used and caused to pass through the work and after cutting one tooth, indexing to the next and so on.

The next earliest is that of Hugo Bilgram, see Patent No. 656,166 dated August 21, 1900. In this method a reciprocating tool having the form of a truncated V operates when in cutting contact with the gear blank to produce spur or helical gears on the principle described as the principle of evolution. The truncated V shaped tool, it will be realized, is the single tooth of a rack.

The next in point of time is probably that of the hobbing method by which a hob is caused to pass across the face of a spur or helical gear blank to produce the gears desired.

The next development in point of time appear to reside in the shaping method by which a gear shaped cutter is caused to reciprocate across the face of the gear blank. The axis of the cutter is in a fixed position with respect to the axis of the blank, said axes of cutter and blank being in a plane. The cutter is moved radially of the cutter and blank into cutting contact with the blank to the fixed position referred to. The cutter and blank are caused to rotate slowly with a velocity corresponding to a feed movement, and as the cutter is reciprocated across the face of the blank the teeth in the gear blank are generated. On each return stroke of the reciprocating movement of the cutter above referred to, the cutter and work are caused to separate radially to avoid dragging the cutting edges of the teeth of the cutter over the cut as is well undersood by mechanics.

In the method just described the axes of the cutter and work are in the same plane as referred to and this plane is fixed, generation of the teeth in the work resulting by rolling the pitch circle of the work with the pitch circle of the cutter. Machines operating on the method just described have been commercially developed, I understand, by the Fellows Gear Shaper Company, under patent to Edwin R. Fellows, and by the Farrel Foundry & Machine Company, under patent to W. E. Sykes.

The present invention has for an object to provide a method of generating with an involute helical gear shaped cutter spur gears with straight teeth provided with involute curves in a plane perpendicular to the axis of said gears, and further to generate involute tooth faces such that all gears cut by the same cutter, or any other helical gear shaped cutter conjugate to the same rack will mesh properly with each other.

A further object of the invention is to provide a method of generating helical or straight tooth gears with a twisted tooth or helical gear shaped cutter.

A further object of the invention is to provide a method of generating helical or straight tooth gears with a twisted tooth or helical gear shaper cutter by which the cutter has true generating action on the curves of the tooth faces being generated on the gear blank during the feed of the cutter.

A still further object is to provide a method which lessens the mechanical difficulties in the cutting of gears and by which gears may be cut with greater facility and accuracy, the method being inherently such that any cutter of a given pitch may be utilized to generate the teeth in either a spur or helical gear with a corresponding pitch, and in the case of helical gears, the cutter has great versatility in that it is not restricted for use to any given angle of helix in a helical gear.

The movements of the cutter and work herein referred to are very easily obtained and form the subject matter of companion applications for Letters Patent for gear shaper, Serial No. 443,185, filed April 10, 1930, and for method and apparatus for generating worm wheels, Serial No. 475,540, filed August 15, 1930.

The drawings accompanying this specification are for the purpose of illustration only.

Referring to the drawings, Fig. 1 is a diagrammatic view illustrating the method as applied to the cutting of a straight tooth of a spur gear showing the position of the cutter in dotted lines at the beginning of the cutting operation in mesh with an imaginary rack shown by dot and dash line, said imaginary rack also meshing with the finished spur gear and showing also the position of the cutter in mesh with said imaginary rack after it has completed the cutting of the teeth of the spur gear referred to.

Figure 1:
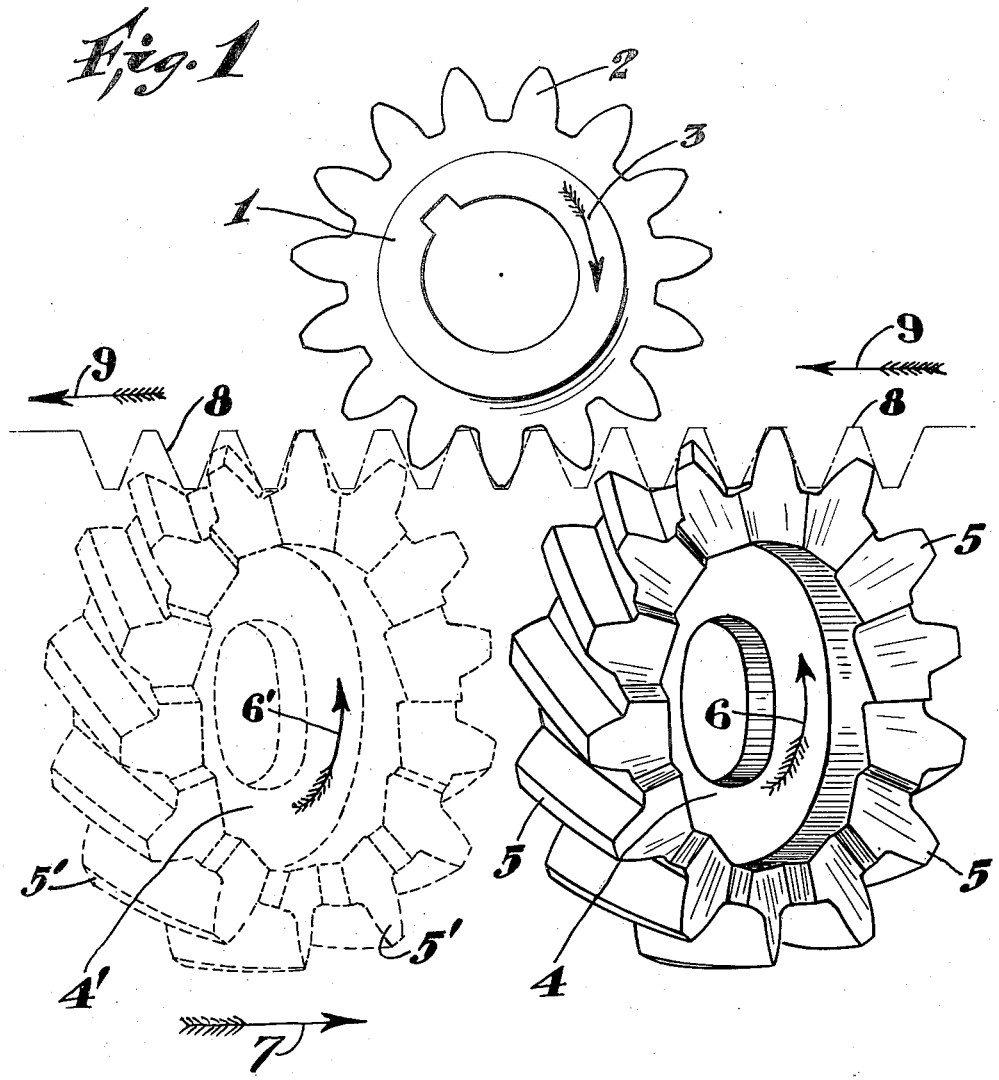
Figure 5:
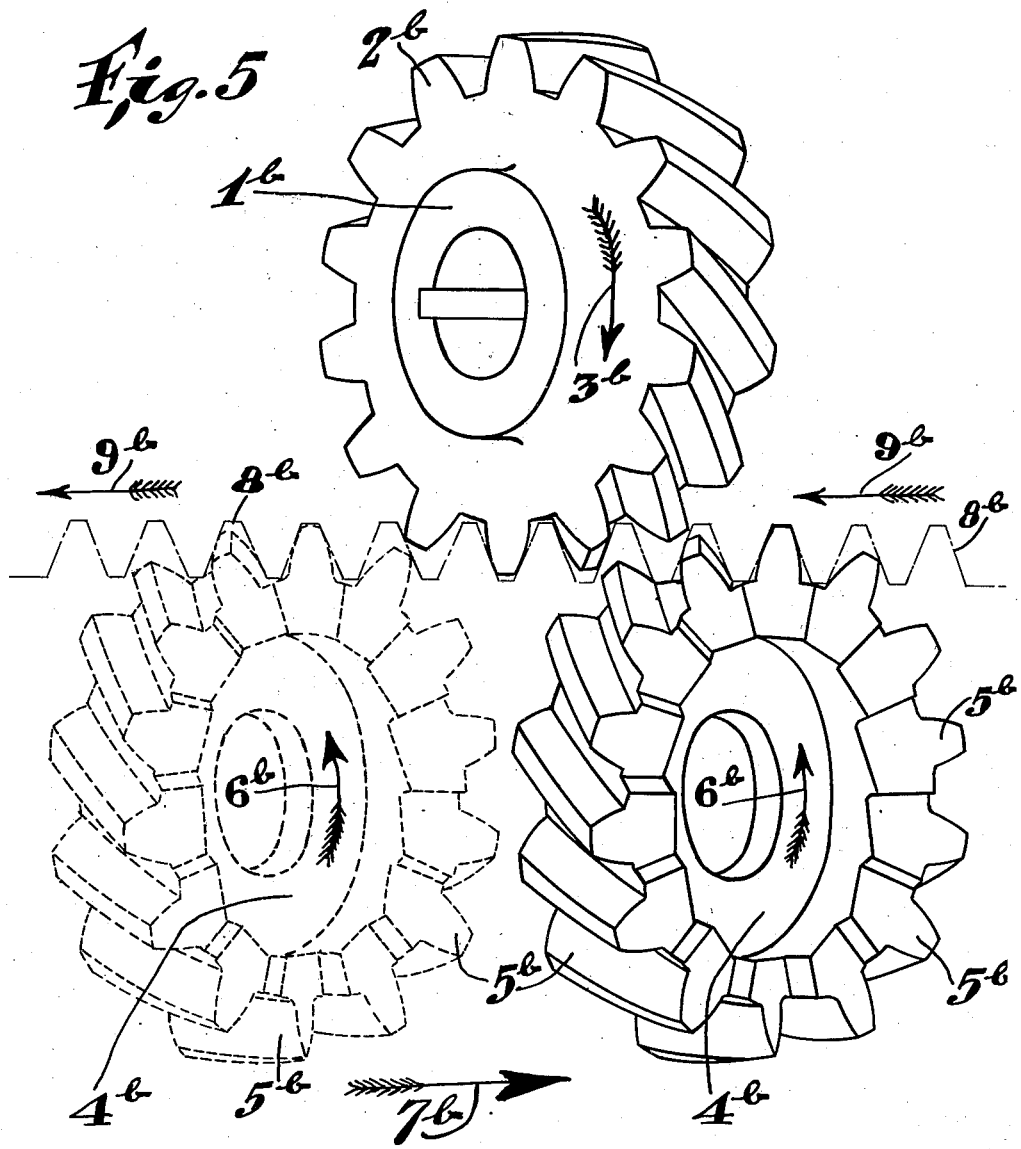

Fig. 5 is a view similar to Fig. 1, except that it illustrates the method as applied to the cutting of helical gears, using the same helical gear shaped cutter and showing the position of the cutter in dotted lines at the beginning of the cutting operation, in mesh with the imaginary rack, shown by dot and dash line, said imaginary rack also meshing with the finished helical gear and showing also the position of the cutter in mesh with said imaginary rack after it has completed the cutting of the teeth of the helical gear referred to.

Figure 6:
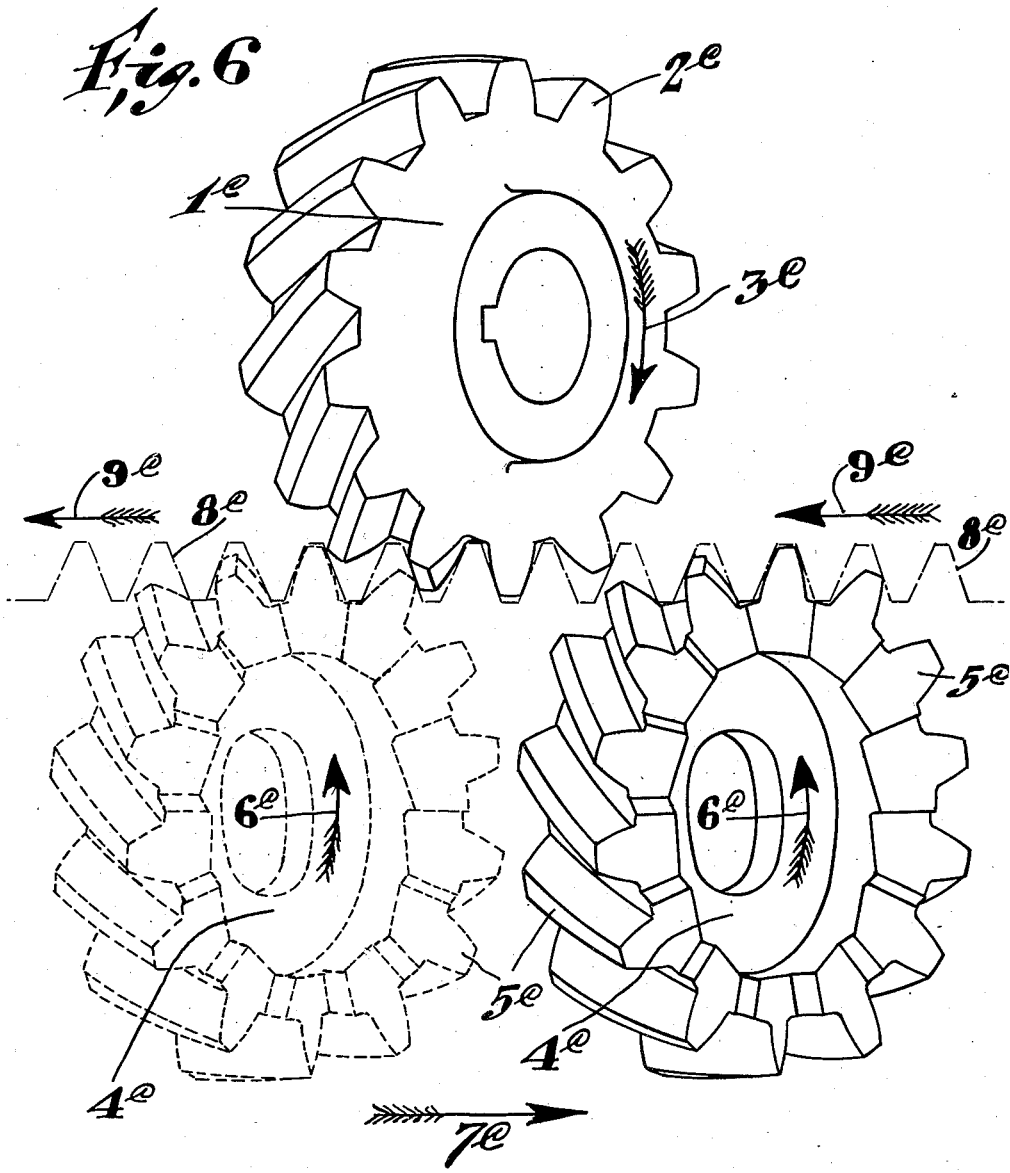

Fig. 6 is a view similar to Fig. 5, except in this instance a right hand helical gear shaped cutter is used to generate the twisted teeth of the left hand gear shown, having a helix angle corresponding to the helix angle of the cutter.

The apparatus for practicing my invention utilizes a twisted tooth or helical gear shaped cutter in which the teeth are twisted to a given angle of helix, the normal pitch being the determining factor as to its utilization for generating the teeth of gears. The commercially known spiral cutter, therefore, of a given normal pitch may be used to cut the teeth of any helical or spur gear of the given pitch. The normal pitch of the cutter is, therefore, the determining factor in the practice of this invention in the utilization of a given pitch cutter and not the helical angle of the cutter.

This does not hold true with respect to the method underlying the Fellows or Sykes machines previously referred to.

My present invention resides broadly in the movements of a commercially known spiral cutter continuously rotating in one direction and reciprocating across the face of the gear blank or work, one stroke of such reciprocating movement being in effect a cutting stroke with the gear shaped cutter in cutting contact with the work, while the other stroke is a non-effective, non-cutting one, it being a return of the cutter to its original position. At the beginning of this last mentioned stroke the cutter is preferably given an additional movement to withdraw it from contact with the gear blank, and after completion of such non-cutting stroke the cutter is again moved into position to effect cutting contact during the cutting stroke. The cutter or the gear blank is simultaneously moved during this reciprocating movement to bring the cutter and the blank closer together, this movement being continued in the same direction to move said cutter and blank apart, the work meanwhile rotating on an axis disposed to the axis of the cutter at an angle corresponding to the helical angle of the teeth of the cutter, to produce straight teeth in the blank, in one aspect of my invention, while in another aspect of my invention the axis of the cutter will be disposed to the axis of the blank corresponding to the sum of the combined helix angles of the cutter and helical blank, to produce helical teeth of the same hand as the cutter. While in still another aspect of my invention the axes of the cutter and blank will be relatively disposed to the same helix angle to produce a helical gear of opposite hand to that of the cutter. The teeth produced in the gears in all cases are conjugate to the imaginary rack conjugate to the cutter.

From the foregoing it is understood in the practice of my method that the straight teeth of a spur gear will result if the axes of the work spindle and cutter spindle are adjusted and secured in angular position, one with the other, corresponding to the helix angle of the helicoidal teeth of the cutter and that the twisted teeth of the helical or spiral gear of the same nature as the cutter will result, if the aforesaid axes are adjusted and secured at the combined angle of the cutter and gear, and that a helical gear of an opposite hand to that of the twisted teeth of the cutter will result if the axes are adjusted to the position so that the plane of each will be parallel to the other.

In my present method, therefore, forming the subject matter of this specification, the straight teeth in a spur gear or the helical teeth in a spiral gear will be produced, dependent upon the adjustment of the axes of the work and cutter, the rectilinear and rotary movements being as heretofore described and as will be more particularly set forth hereafter.

From the foregoing, it is further understood that in the practice of my method, a given helical cutter is adaptable for use in generating the teeth of any spur or helical gear of a given pitch, and in the case of the latter right or left hand helicoidal teeth will be generated with the same cutter, it being merely a matter of adjustment of the apparatus and correlation of the rectilinear and rotary movements.

Referring to Fig. 1, the spur gear 1 is provided with straight teeth 2, and is adapted to rotate slowly on its axis in the direction of the arrow 3. The teeth 2 of the gear 1 are shown in the drawings as having been cut completely by means of the helical gear shaped cutter 4 which is provided with the teeth 5. The cutter 4 is adapted to be secured to the cutter spindle of a suitable apparatus or machine previously referred to, and to be continuously rotated in the direction of the arrow 6 and simultaneously moved slowly in the direction indicated by the arrow 7 along a preferably rectilinear line, parallel to the preferably rectilinear line of movement of the continuously moving imaginary rack 8, said imaginary rack moving in the direction indicated by the arrow 9.

Figure 2:
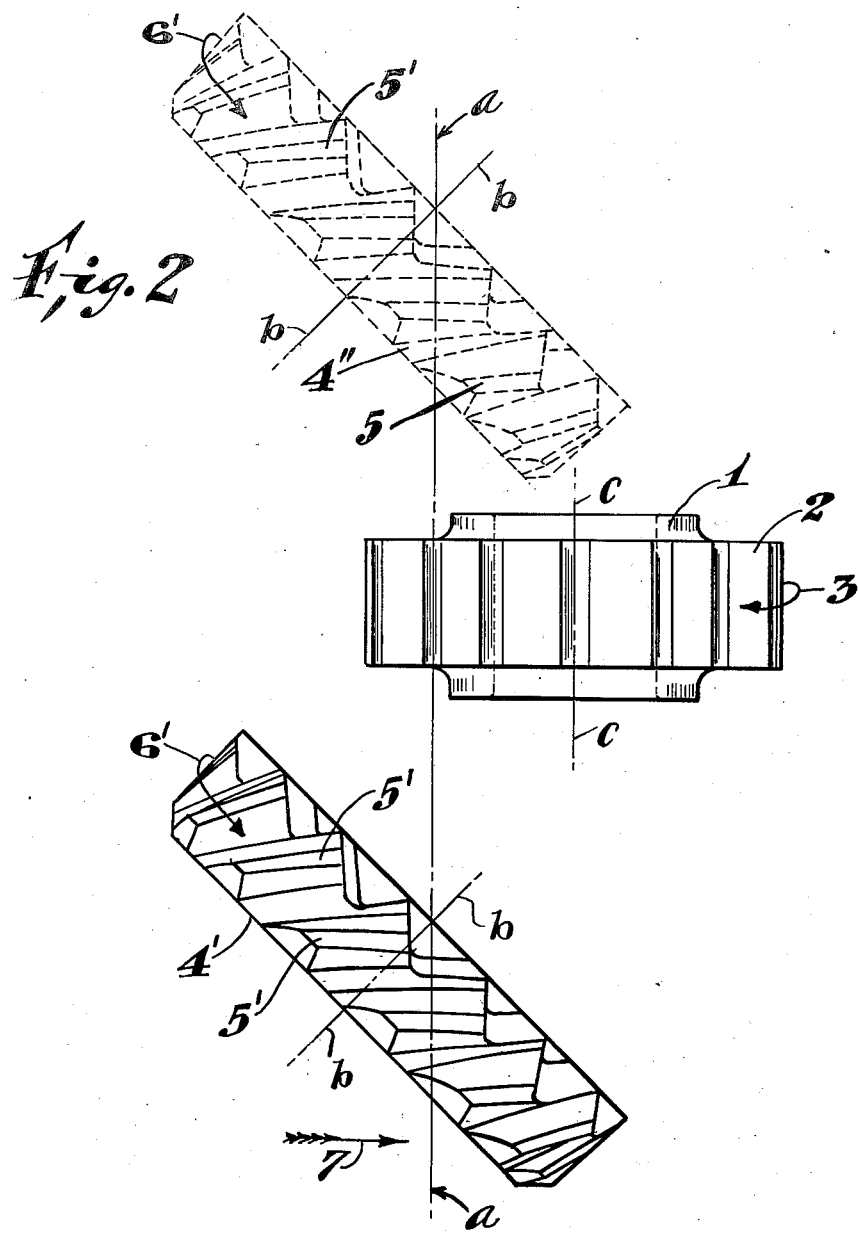
Fig. 2 is a plan view showing in full lines the position of the gear blank and the helical gear shaped cutter at the beginning of the cutting operation, the cutter being shown in dotted lines at the end of its first cutting stroke.

The same method would prevail if the arrows 7 and 9 indicated a curvilinear path of movement instead of a rectilinear path of movement, in which event the imaginary rack 8 would be correspondingly curved. The cutter 4 is known commercially as a spiral gear shaper cutter. The position of the cutter 4 as shown in the drawings, Fig. 1, is substantially the position of the cutter after it has completed the cutting of the teeth 2 of the gear 1. In this method the first position of the cutter 4, before cutting the teeth 2 of the gear 1, is indicated by the numeral 4' and all other reference numerals being the same and indicating the same thing, but having the exponent sign prime (') attached. The cutter in this position is shown and represented by dotted lines, and is assumed to be reciprocating toward and away from the observer, along a line perpendicular to the plane of the sheet of drawings of Fig. 1, which is along line $a$—$a$, shown in Fig. 2, a required measure of distance to clear the gear 1 as illustrated in Fig. 2. The gear shaper cutter 4', is also rotating in the direction of the arrow 6', and moving in the direction indicated by the arrow 7. The rotary movement 3, of the gear 1, and the rotary movement 6', of the gear shaped cutter 4', being of such velocity as would be obtained if the gear 1 and cutter 4' were meshing with the imaginary rack 8 as shown, while the rack 8 is continuously moving in the direction indicated by the numeral 9; meanwhile the cutter 4', rotating continuously in the direction of the arrow 6', also slowly moves along a rectilinear line in the direction of the arrow 7, from the position of the cutter 4' to the position of the cutter 4. In the foregoing movements, it will be observed that the movements of gear 1 and cutter 4, with intermeshing rack 8, is continuous. The imaginary continuously moving rack, therefore, is of infinite length, and its movement in the direction of the arrow 9 is continuous.

In the aforesaid rotary movements of the cutter and work, the axis $b$—$b$ of the cutter 4, see Fig. 2, is disposed angularly with respect to the axis $c$—$c$, of the work 1, to effect alignment between the teeth of the cutter in cutting contact and the teeth of the work being operated upon by the said cutter.

Figure 3:
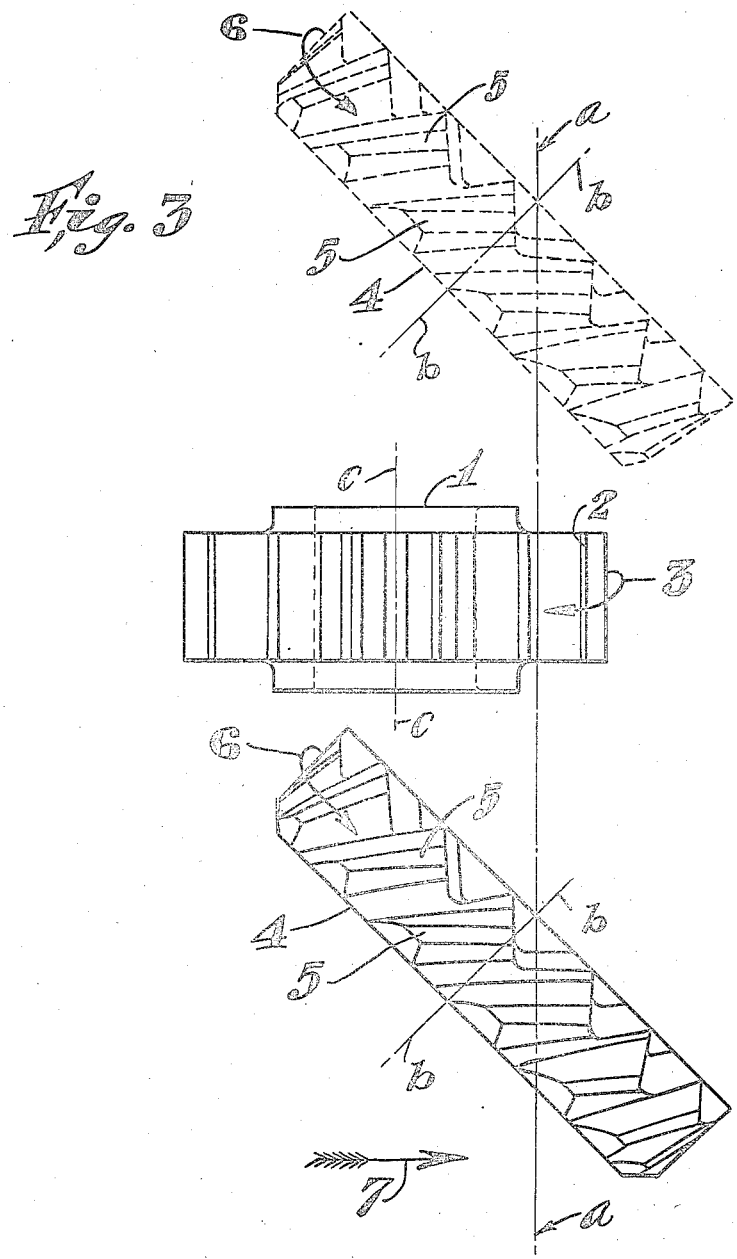
Fig. 3 is a view which corresponds to Fig. 2, except in this view the helical gear shaped cutter is shown in the position which it occupies when the cutting of the straight teeth in the gear is completed.

It is to be further observed that the aforesaid reciprocating movement of the cutter 4, along the line $a$—$a$, see Figs. 2 and 3, is along a line parallel to the straight teeth of the spur gear illustrated and which is also along a line parallel to the axis $c$—$c$ of said gear.

It is further obvious in the practice of the method referred to that the line $a$—$a$, the path of reciprocating movement of the cutter, is to one side of the gear being cut at the beginning of the operation of cutting the teeth 2, of the gear, and that it is at the other side of the gear being cut when at the end of the operation of cutting the teeth, see Figs. 2 and 3.

It will be understood that I could just as readily continuously rotate and move the gear 1 in mesh with its continuously moving imaginary rack across and into and out of contact with the reciprocating rotating cutter, as I have moved the cutter in mesh with the rack into and out of contact with the gear as described. This is illustrated in the drawings Fig. 4, the gear, cutter and characters being indicated by the same reference numerals but having the exponent "a" attached.

The present invention also provides a method of cutting helical gears of any desired helix angle with the same helical gear shaper cutter. This is possible for the reason that regardless of the angular position of the cutter axis with respect to the axis of the gear blank, the cutter will generate a gear conjugate to its rack, the teeth of which will mesh and have line contact with any gear of the same or an identical cutter. This is illustrated in Fig. 5, the gear, cutter and characters being indicated by the same reference numerals but having the exponent "b" attached.

It is also obvious that I can, by the method herein described, dispose the axes of the cutter and blank to such angular positions, one with the other, as to produce the spiral twisted teeth of helical gears of one hand when using a helical cutter of the opposite hand. This is illustrated in Fig. 6. The gear, cutter and characters being indicated by the same reference numerals but having the exponent "c" attached.

The straight teeth of a spur gear illustrated in Fig. 1 will result if the axes of the work spindle and cutter spindle are adjusted to and secured in angular positions (not parallel), one with the other. By the expression secured in angular position, with reference to Fig. 1, I mean that the axis of the work may be adjustably positioned perpendicular to the plane of the surface of the sheet of drawings of Fig. 1, when the axis of the cutter is adjustably disposed to an angle thereto and vice versa. The same movements, however, as herein referred to, will continue, and a given point on the axis of one will approach a given point on the axis of the other until finally the minimum measure of distance between said given points on the axes is reached, and the movements continuing as described, therefore, will increase the measure of distance between said given points on the axes. In other words, the cutter and gear blank will be moved closer together and by continuing such movement in the same direction the cutter and gear blank will then be moved apart. In this movement the axes of the work spindle and cutter spindle will always be disposed at an angle to each other as illustrated in the drawings and the reciprocation of the cutter will always be along a line perpendicular to the plane normal to the tooth helicoid, or, as illustrated in the drawings, along a line perpendicular to the plane of the sheets of drawings Figs. 1, 4, 5 and 6.

The position of the cutter 4, as it begins to cut the teeth of the gear 1, is illustrated in Fig. 2. It will be observed that the position of the cutter 4, is shown in full lines for purpose of illustration only, to the left of the gear 1, and on its lowermost position of the stroke, while at the top of its stroke, it is represented by dotted lines and indicated by the numeral 4″.

In Fig. 3 the teeth 2 of the gear 1 are shown as having been completed by the cutter 4, thus Fig. 2 corresponds substantially to the position of the gear 1 and cutter 4′ of Fig. 1, and Fig. 3 corresponds substantially to the position of the gear 1 and cutter 4 of Fig. 1.

Figure 4:
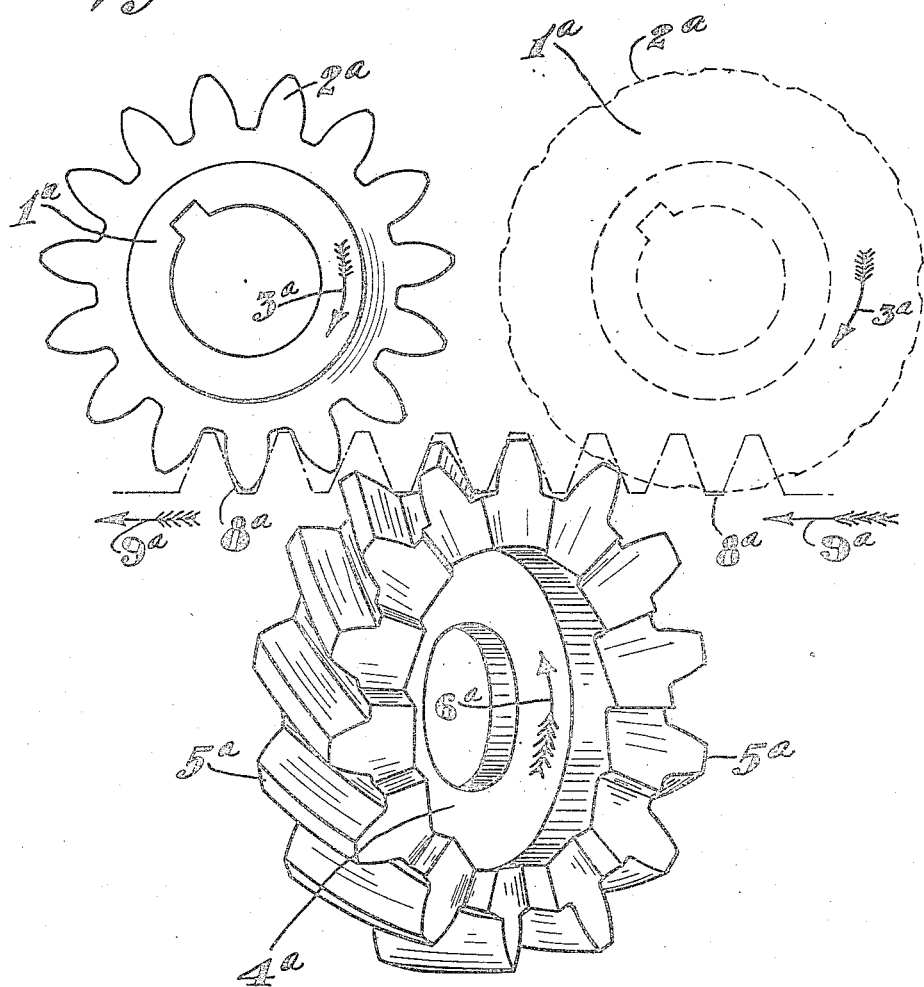
Fig. 4 is a view similar to Fig. 1, except in this view the straight tooth gear is shown as having the two positions occupied by the cutter of Fig. 1; namely, before and after the teeth are cut.

It is to be noted with respect to Fig. 1 that a right hand helical cutter is used to produce the straight teeth of the spur gear shown. This is also shown in Figs. 2, 3 and 4. A left hand cutter could be used with equal facility, it being simply a matter of axes adjustment together with correct correlation of the movements referred to.

It will be further observed in Fig. 1, that the axes of the work and cutter are disposed to each other at the angle of helix in the cutter.

With reference to Fig. 5, it will be observed that the same right hand helical cutter is being used to cut the teeth in the right hand helical gear and further that the axes of the gear and cutter are disposed to each other at angles determined by the angle of the helix of the gear plus the angle of helix of the cutter.

With reference to Fig. 6, it will be observed that in the case of a right hand helical cutter cutting the teeth of a left hand helical gear, having the same helix angle as the helix angle of the teeth of the cutter, the axes of the work and cutter will be parallel to each other. From this, therefore, it follows that if a left hand helical gear of a given helix angle is cut by a right hand cutter of a different helix angle, the axes of the work and cutter will be disposed at an angle to each other. The reciprocation of the cutter, however, regardless of the adjustment of the axes of the cutter and work to meet the conditions above referred to, will be along a line parallel to the twisted teeth of the cutter and this line will be, as previously stated in the example referred to, perpendicular to the sheets of drawings of Figs. 1, 4, 5 and 6, or along lines a—a, Figs. 2 and 3.

In generating gears or gear shaper cutters by the present method, the cutting edges of the helical cutter during the cutting action roll on the faces of the teeth of the imaginary moving rack while the rotary movement of the blank is that of a conjugate gear having rolling movement on the same rack. The helical gear shaper cutter, therefore, has the same generating action as a straight tooth involute gear shaper cutter whose axis is parallel with the direction of reciprocating movement. Where the axis of the blank is parallel with the teeth of the imaginary rack, a straight tooth involute gear is generated and when the axis of the blank is disposed at an angle to the teeth of the rack, a helical gear is generated.

Gears cut in accordance with the present invention will roll on the rack conjugate to the gear shaper cutter employed in cutting them and all gears cut by the helical cutter conjugate to the same rack will mesh properly with each other.

Gear shaper cutters are ordinarily cut back at an incline on their front faces to give a cutting rake to the teeth in order to obtain better cutting action. An error due to the rake of the teeth may be accurately compensated for in straight tooth cutters by merely increasing the pressure angle, thus decreasing the lead of the involute in a given cutter, as is now well understood in the art.

What I claim is:

1. The herein described method of generating teeth in a gear blank with a gear shaper cutter having helical teeth which comprises positioning the cutter with its axis at an angle to the axis of the blank, moving the cutter laterally with respect to the blank along the common tangent to the pitch circles of the cutter and blank, rotating the cutter and blank at the rates at which they would be driven by an imaginary rack moving along said tangent line, and reciprocating the cutter to generate the teeth of the gear blank.

2. The herein described method of generating teeth in a gear blank with a gear shaper cutter having helical teeth which comprises positioning the cutter with its axis at an angle to the axis of the blank, feeding the cutter tangentially with respect to the blank while rotating the cutter and blank at speeds such as to maintain both in intermeshing relation with respect to an imaginary rack meshing with both the cutter and blank and reciprocating the cutter to generate the teeth of the gear blank.

3. The herein described method of generating teeth in a gear blank with a gear shaper cutter having helical teeth which comprises positioning the cutter with its axis at an angle to the axis of the blank, rotating the cutter and blank at different peripheral speeds at their pitch circles, imparting a relative movement to the gear blank and cutter at the speed necessary to maintain both in intermeshing relationship with an imaginary continuously moving rack conjugate to the cutter and gear blank, and reciprocating the cutter to generate the teeth of the gear blank.

4. The herein described method of generating teeth in a gear blank with a gear shaper cutter having helical teeth which comprises positioning the cutter with its axis at an angle to the axis of the blank, rotating the cutter and blank in intermeshing relation, reciprocating the cutter across the face of the blank and simultaneously moving the cutter laterally into and out of engagement with the blank while maintaining intermeshing relationship between the cutter, the blank and an imaginary rack conjugate to both the cutter and blank and moving between the same.

5. The herein described method of generating teeth in a gear blank with a gear shaper cutter having helical teeth which comprises positioning the cutter with its axis at an angle to the axis of the blank corresponding to the helix angle of the cutter teeth, rotating the cutter and blank in intermeshing relation, reciprocating the cutter across the face of the blank in the direction of the axis of the blank, and feeding the cutter laterally with respect to the axis of the blank while maintaining intermeshing relationship between the cutter, the blank, and an imaginary rack conjugate to both the cutter and blank and moving between the same.

6. A method of generating teeth in gear blanks, comprising rotating a gear shaped cutter having helical teeth in intermeshing relation with a rotating gear blank, reciprocating the cutter transversely of the face of the gear blank, and simultaneously moving the cutter and gear blank closer together by relative movement along a line tangent to a pitch circle of the cutter and gear blank.

7. The method of generating helical teeth in gear blanks, comprising rotating a gear shaped cutter having helical teeth in intermeshing relation with a rotating gear blank, the axes of the cutter and gear blank being disposed with respect to each other at an angle equal to the sum of the helix angle of the cutter and the helix angle of the teeth to be generated on the blank, relatively reciprocating the cutter and blank transversely of their faces, and moving the cutter and blank closer together by relative movement along a line tangent to a pitch circle of the cutter and gear blank.

8. The method of generating helical teeth in gear blanks, which comprises rotating a gear shaped cutter having helical teeth of the same hand as the teeth to be generated in the blank in intermeshing relation with a rotating gear blank, the axis of the cutter being disposed at an angle to the axis of the blank corresponding to the sum of the helix angle of the teeth of the cutter and the helix angle of the teeth to be generated in the blank, reciprocating the cutter transversely of the face of the blank along a line perpendicular to the plane normal to the tooth helicoid, and simultaneously moving the cutter and gear blank closer together by relative movement along a line tangent to a pitch circle of the cutter and gear blank.

9. The method of generating helical teeth in gear blanks, which comprises rotating a gear shaped cutter having helical teeth in intermeshing relation with a rotating gear blank, the axes of the cutter and blank being arranged at an angle equal to the difference between the helix angle of the teeth of the cutter and the helix angle of the teeth to be generated on the blank, relatively reciprocating the cutter and blank transversely of their faces, and moving the cutter and gear blank closer together by relative movement along a line tangent to a pitch circle of the cutter and gear blank.

10. The method of generating helical teeth in gear blanks, which comprises rotating a gear shaped cutter having helical teeth of the opposite hand to the helical teeth to be generated on the blank in intermeshing relation with a rotating gear blank, the axes of the cutter and gear blank being arranged parallel to each other, relatively reciprocating the cutter and blank transversely of their faces, and simultaneously moving the cutter and gear blank closer together by relative movement along a line tangent to a pitch circle of the cutter and gear blank.

11. The herein described method of generating helical teeth in a gear blank with a gear shaper cutter having helical teeth, which comprises positioning the cutter with its axis at an angle to the axis of the blank corresponding to the sum of the helix angle of the teeth of the cutter and the helix angle of the teeth to be generated on the blank, relatively moving the cutter and blank laterally along the common tangent to the pitch circles of the cutter and blank, rotating the cutter and blank at the rates at which they would be driven by an imaginary rack moving along said tangent line, and relatively reciprocating the cutter and blank transversely of their faces to generate the teeth of the gear blank.

12. The herein described method of generating helical teeth in a gear blank with a gear shaper cutter having helical teeth, which comprises positioning the cutter with its axis parallel to the axis of the blank, relatively moving the cutter and blank laterally along the common tangent to the pitch circles of the cutter and blank, rotating the cutter and blank at the rates at which they would be driven by an imaginary rack moving along said tangent line, and relatively reciprocating the cutter and blank transversely of their faces to generate the teeth of the gear blank.

13. The herein described method of generating helical teeth in a gear blank with a gear shaper cutter having helical teeth, which comprises positioning the cutter with its axis at an angle to the axis of the blank corresponding to the sum of the helix angle of the teeth of the cutter and the helix angle of the teeth to be generated in the blank, rotating the cutter and blank at different peripheral speeds at their pitch circles, imparting a relative movement to the gear blank and cutter at the speed necessary to maintain both in intermeshing relationship with an imaginary continuously moving rack conjugate to the cutter and gear blank, and relatively reciprocating the cutter and blank transversely of their faces to generate the teeth of the gear blank.

14. The herein described method of generating helical teeth in a gear blank with a gear shaper cutter having helical teeth, which comprises postioning the cutter with its axis parallel to the axis of the blank, rotating the cutter and blank at different peripheral speeds at their pitch circles, imparting a relative movement to the gear blank and cutter at the speed necessary to maintain both in intermeshing relationship with an imaginary continuously moving rack conjugate to the cutter and gear blank, and relatively reciprocating the cutter and blank transversely of their faces to generate teeth of the gear blank.

15. The herein described method of generating straight teeth in a gear blank with a gear shaper cutter having helical teeth which comprises positioning the cutter with its axis at an angle to the axis of the blank corresponding to the helix angle of the cutter teeth, rotating the cutter and blank in intermeshing relation, reciprocating the cutter across the face of the blank, and simultaneously moving the cutter laterally into and out of engagement with the blank while maintaining intermeshing relationship between the cutter, the blank, and an imaginary rack conjugate to both the cutter and blank and moving between the same.

16. The herein described method of generating teeth in a gear blank with a gear shaper cutter having helical teeth which comprises positioning the cutter with its axis at an angle to the axis of the blank corresponding to the helix angle of the cutter teeth, rotating the cutter and blank in intermeshing relation, relatively reciprocating the cutter and blank across their faces in the direction of the axis of the blank, and feeding the cutter laterally with respect to the axis of the blank while maintaining intermeshing relationship between the cutter, the blank, and an imaginary rack conjugate to both the cutter and blank and moving between the same.

17. The herein described method of generating straight teeth in a gear blank with a gear shaper cutter having helical teeth which comprises positioning the cutter with its axis at an angle to the axis of the blank corresponding to the helix angle of the cutter teeth, moving the cutter laterally with respect to the blank along the common tangent to the pitch circles of the cutter and blank, rotating the cutter and blank at the rates at which they would be driven by an imaginary rack moving along said tangent line, and relatively reciprocating the cutter and blank to generate the teeth of the gear blank.

18. The herein described method of generating teeth in a gear blank with a gear shaper cutter having helical teeth which comprises positioning the cutter with its axis at an angle to the axis of the blank, imparting a relative feeding movement to the cutter and blank tangentially of the blank while rotating the cutter and blank at speeds such as to maintain both in intermeshing relation with respect to an imaginary rack meshing with both the cutter and blank, and relatively reciprocating the cutter and blank to generate the teeth of the gear blank.

19. The herein described method of generating straight teeth in a gear blank with a gear shaper cutter having helical teeth which comprises positioning the cutter with its axis at an angle to the axis of the blank corresponding to the helix angle of the cutter teeth, rotating the cutter and blank at different peripheral speeds at their pitch circles, imparting a relative movement to the gear blank and cutter at the speed necessary to maintain both in intermeshing relationship with an imaginary continuously moving rack conjugate to the cutter and gear blank, and relatively reciprocating the cutter and blank to generate the teeth of the gear blank.

20. The herein described method of generating helical teeth of one hand in a gear blank with a gear shaped cutter having helical teeth of the opposite hand which comprises positioning the axes of the cutter and blank at an angle to each other corresponding to the difference between the helix angle of the cutter teeth and the helix angle of the teeth of the gear blank, relatively moving the cutter and blank laterally along the common tangent to the pitch circles of the cutter and blank, rotating the cutter and blank at the rates at which they would be driven by an imaginary rack moving along said tangent line, and relatively reciprocating the cutter and blank transversely of their faces to generate the teeth of the gear blank.

In testimony whereof I affix my signature.

OLIVER G. SIMMONS.